United States Patent [19]
Herting

[11] Patent Number: 4,859,476
[45] Date of Patent: * Aug. 22, 1989

[54] BAKED WAFER OR CONE WITH PRINTED MATTER

[75] Inventor: Heinrich Herting, Herne, Fed. Rep. of Germany

[73] Assignee: Firma Karl Oexmann, Inh. Wolfmann Oexmann, Gelsenkirchen-Hessler, Fed. Rep. of Germany

[*] Notice: The portion of the term of this patent subsequent to Aug. 2, 2005 has been disclaimed.

[21] Appl. No.: 169,681

[22] Filed: Mar. 18, 1988

Related U.S. Application Data

[62] Division of Ser. No. 882,267, Jul. 7, 1986.

[30] Foreign Application Priority Data

Jul. 5, 1985 [DE] Fed. Rep. of Germany ....... 3524116
Apr. 19, 1986 [DE] Fed. Rep. of Germany ....... 3613292

[51] Int. Cl.$^4$ ....................... A21D 13/00; A23G 3/28
[52] U.S. Cl. ..................... 426/87; 426/138; 426/139
[58] Field of Search ......................... 426/87, 138, 139

[56] References Cited

U.S. PATENT DOCUMENTS

| | | | |
|---|---|---|---|
| 2,069,026 | 1/1937 | Balton | 99/373 |
| 4,285,978 | 8/1981 | Quinliuan | 426/87 |
| 4,578,273 | 3/1986 | Krubert | 426/87 |

Primary Examiner—Donald E. Czaja
Assistant Examiner—Helen Pratt
Attorney, Agent, or Firm—Herbert Dubno

[57] ABSTRACT

An imprint in edible ink is applied directly to a baked wafer or leaf which is formed into a cone for ice-cream or the like.

1 Claim, 4 Drawing Sheets

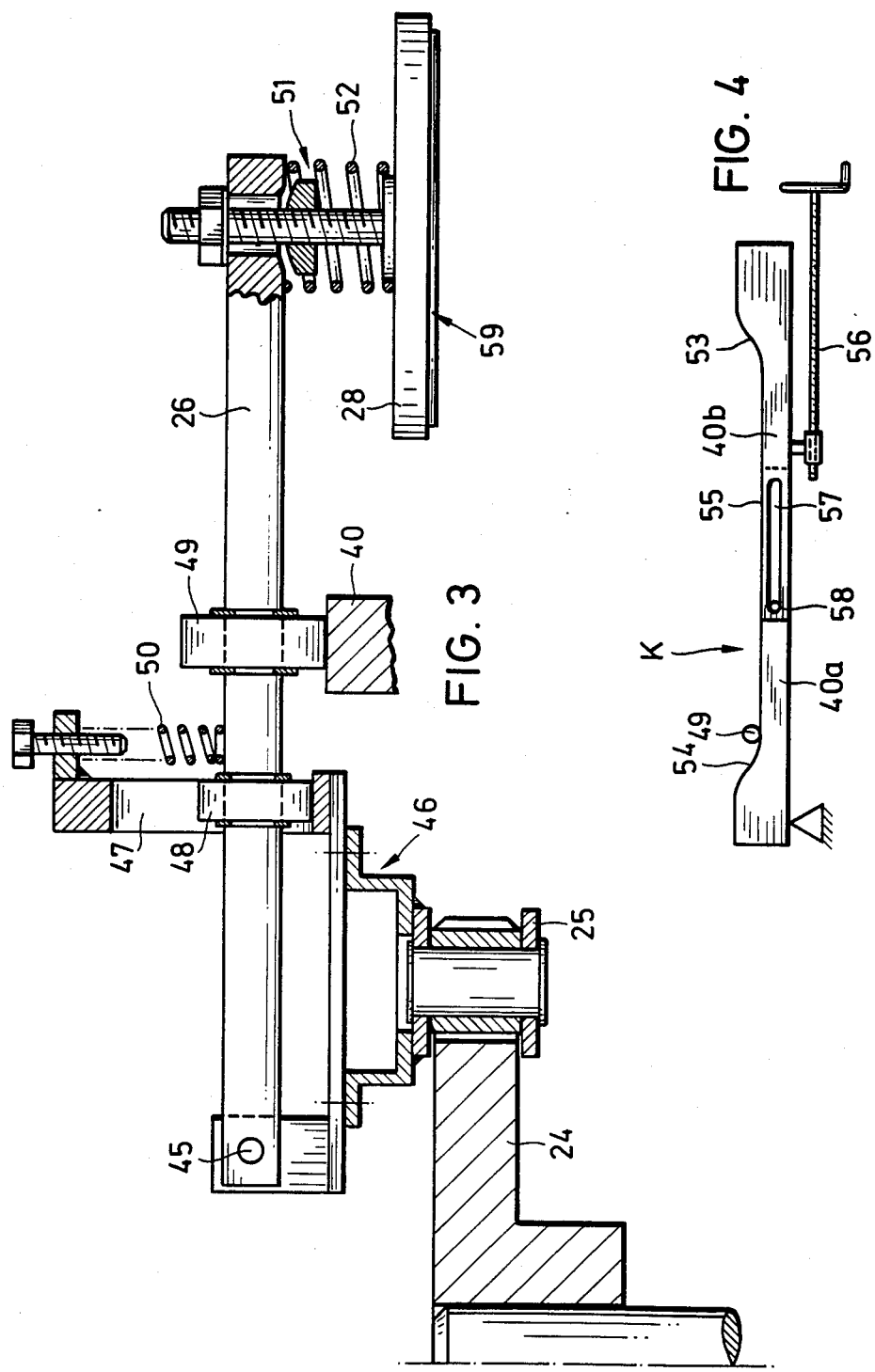

BAKED WAFER OR CONE WITH PRINTED MATTER

FIELD OF THE INVENTION

This is a divisional of co-pending application Ser. No. 882,267 filed on July 7, 1986.

My present invention relates to a method of making baked cones or cornets of baked wafer elements, especially coiled cones adapted to receive ice-cream or other comestible products. It is also an aspect of this invention to provide an improved apparatus for making such cones or cornets and for carrying out the method of the invention.

BACKGROUND OF THE INVENTION

Baked cones or cornets are baked goods, i.e. are composed of baked dough. The principal use of such articles is in the dispensing or distribution of ice-cream although they have been used for serving other comestible products.

The cones can be baked in the conical shape directly or formed as more or less flat wafers or leaves, e.g. in waffle-baking forms or the like, the forms comprising upper and lower baking plates or jaws which can be closed on one another.

Usually, the baking process takes place by continuously displacing the leaves through the oven, e.g. in the forms or along a transport path which has, at the end thereof, a device for coiling the baked wafer before it is cooled. Upon cooling, the conically-coiled wafer tends to retain its shape.

While such cones or cornets are used to dispense fresh ice-cream or the like, they also can be prepackaged with ice-cream which can be stored individually or in cartons containing a number of foil or paper-wrapped articles in a freezer.

With wrapped products, there generally is little problem in labelling or providing advertisement. However, it has not been possible heretofore to provide filled cones which are dispensed from a freezer or even fresh cones filled with ice-cream or the like, with appropriate commercial messages and advertising. It has not been practical up to now, therefore, to use the cone itself as an advertising or information-conveying medium.

OBJECTS OF THE INVENTION

It is, therefore, the principle object of the present invention to provide an improved method of making a baked cone or cornet for use in the dispensing of ice-cream or some other comestible, whereby these drawbacks are obviated.

Another object of this invention is to provide an improved apparatus for making such cones or cornets.

It is also an object of the invention to provide an improved baked cone or cornet.

Still another object of my invention is to provide an improved apparatus for carrying out the method of this invention.

SUMMARY OF THE INVENTION

These objects are attained in accordance with the present invention in a method in which the baked article adapted to form the cone is printed in its hot state, especially during or directly following baking or at least toward the end of the passage of the baked article from the baking machine or during the transfer of the article to the cone-forming device.

Specifically, the method of the invention can comprise the steps of forming bakable wafer elements, cooling the baked elements to rigid articles, and printing directly on these elements in a hot state thereof resulting from baking, indicia of contrasting coloration to the material of the elements subsequent to the formation of them but prior to complete cooling of the baked elements to rigid articles whereby the indicia remain visible on the cones upon the introduction of a food stuff onto the cones.

Advantageously, before the baked elements completely coil, the elements which are formed and baked as flat leaves are coiled into the shape generally of the cones after the printing of the indicia thereon while the leaves are flat and prior to complete cooling of the flat leaves.

Because the wafer cones are printed, the indicia which can be letters, designs, patterns, images, drawings, script, numbers or anything which may be conveyed by printing especially stamping, the cones can form part of a sales program and can convey any desirable messages with respect to the product or with respect to any other subject matter which may be desired.

It is important to the invention that the printing of the baked goods be effected rapidly and automatically in the course of the automatic fabrication of the cones and that the improvement of the invention should not delay the fabrication of the cones and should be economical.

The printing process of the invention is effected directly during the fabrication of the wafer cones so that any storage of baked goods for the purposes of printing can be avoided. The invention also avoids possible damage to the baked product and also precludes contamination which might result from excessive handling of the articles.

It has been found to be especially advantageous, according to the invention, that the printing of the baked products take place while the latter is in a hot state resulting from baking. In the latter case, when the printing stamp is brought into contact with the baked article, the latter tends to draw by capillarity or absorption, the printing ink into the interior of the baked article so that the print has high resolution and the edible ink which is used can dry very rapidly, thereby permitting further handling of the baked good which may be necessary without any danger that the print will smear.

In the case in which the cones are formed by coiling, the baked wafer leaves, the present invention provides that the leaves are printed when they are warm and structurally stable, although not yet fully hardened, i.e. while they remain soft and flexible enough the coil.

The printing can be effected, therefore, immediately after removal of the baked leaves from the baking form, preferably in conjunction with the transfer of the baked leaves to the cooling form, or when the baked leaves are upwardly exposed and rest upon the lower form plate with the baking form. Indeed, the printing can be effected by the same stamp-like element which may be lowered upon the leaf to transfer the leaf from the lower form member to a metal sheet or conveyer entraining the leaf to the coiling device.

Naturally, it is also possible to provide one or more separate stamps, which are not necessarily associated with and do not form part of the leaf transfer means for displacing the leaf along the transport path to the cone-forming coiling device. Such stampers need only be brought briefly into contact with the baked goods because of the effective bibulous adhesion of the ink to the hot product which sucks-up the ink, i.e. a blotter and allows the ink rapidly to dry thereon.

The leaves, of course, can be composed of a dough composition designed so that following baking the product remains sufficiently flexible to enable it to be coiled into the cone-shape for a period before cooling results in complete stiffening.

I have found it to be advantageous to cool the printing stamp or the device for applying the coloring matter to the printing stamp.

This coloring matter hereinafter referred to as an ink, can consist of any edible colorant, especially pharmaceutically acceptable carbon such as the activated charcoal USP in a liquid base manufactured by BOMAN PHARMACEUTICALS, INC. in Canton, Ohio.

This product provides an especially visible block print on the brownish background of the cone.

According to another aspect of this invention, the apparatus can comprise a continuous baking machine provided with baking forms displaceable therealong and having an opening along a discharge side of the machine. Each of the forms can have upper and lower form members receiving respective members between them, producing a flat leaf, the upper form members being displaceable into open positions from above at the openings.

The means for printing can include at least one printing stamp, drive means for displacing the printing stamp along a closed path where the stamp is displaced along the transport path to the coiler at the opening and an inking stretch adjoining the printing stretch, and inking means for transferring ink to the stamp at the printing stretch.

Control means can be provided for lowering the stamp onto the leaves after the stamp has been inked, for raising the stamp from contact with the leaf, for lowering the stamp onto inking means which can include an ink or an inking roller, and for raising the stamp from the inking means.

BRIEF DESCRIPTION OF THE DRAWING

The above objects, features and advantages will become more readily apparent after the following description, reference being made to the accompanying highly diagrammatic drawing, in which:

FIG. 3 is a fragmentary section showing an alternative to the construction arrangement of FIG. 2 but shown only fragmentarily and in enlarged form;

FIG. 4 is a diagrammatic illustration of a slide device for use in accordance with this invention.

SPECIFIC DESCRIPTION

Figure 5:
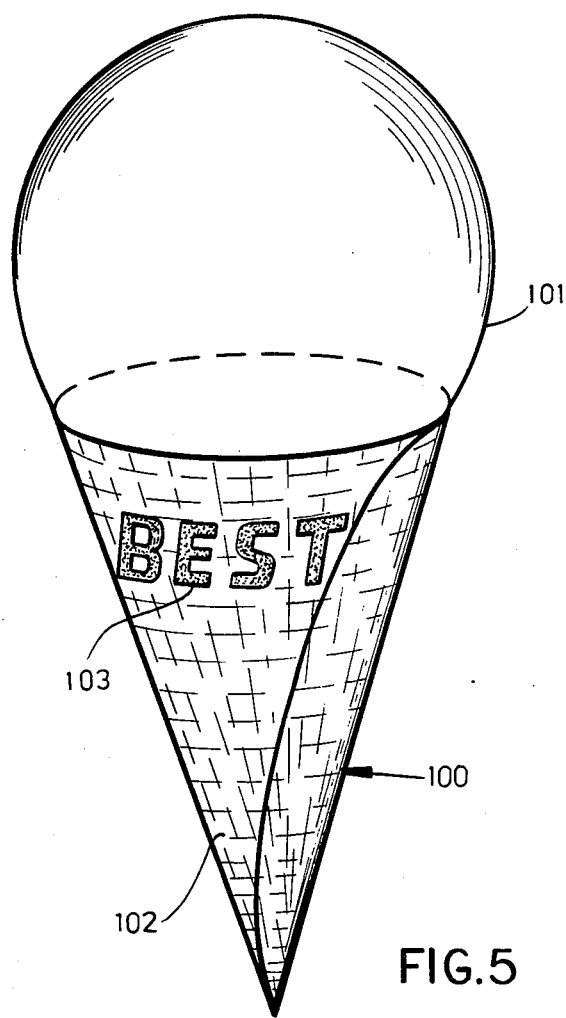
FIG. 5 is a perspective view of an ice-cream cone.

Referring first to FIG. 5, it can be seen that a cone 100 can be formed by coiling a wafer after it has been baked and before it completely hardens into a conical shape so that the cone may be filled with ice-cream 101 or some other comestible. According to the invention, an exposed surface 102 of the cone is printed as diagrammatically illustrated at 103 with an edible ink which dries rapidly, penetrates into the baked article and is of contrasting coloration with respect to the surface 102 so that an advertising slogan, logo, pictoral display, or like indicia can be provided and can be visible to the consumer even if the article remains unwrapped.

Figure 1:
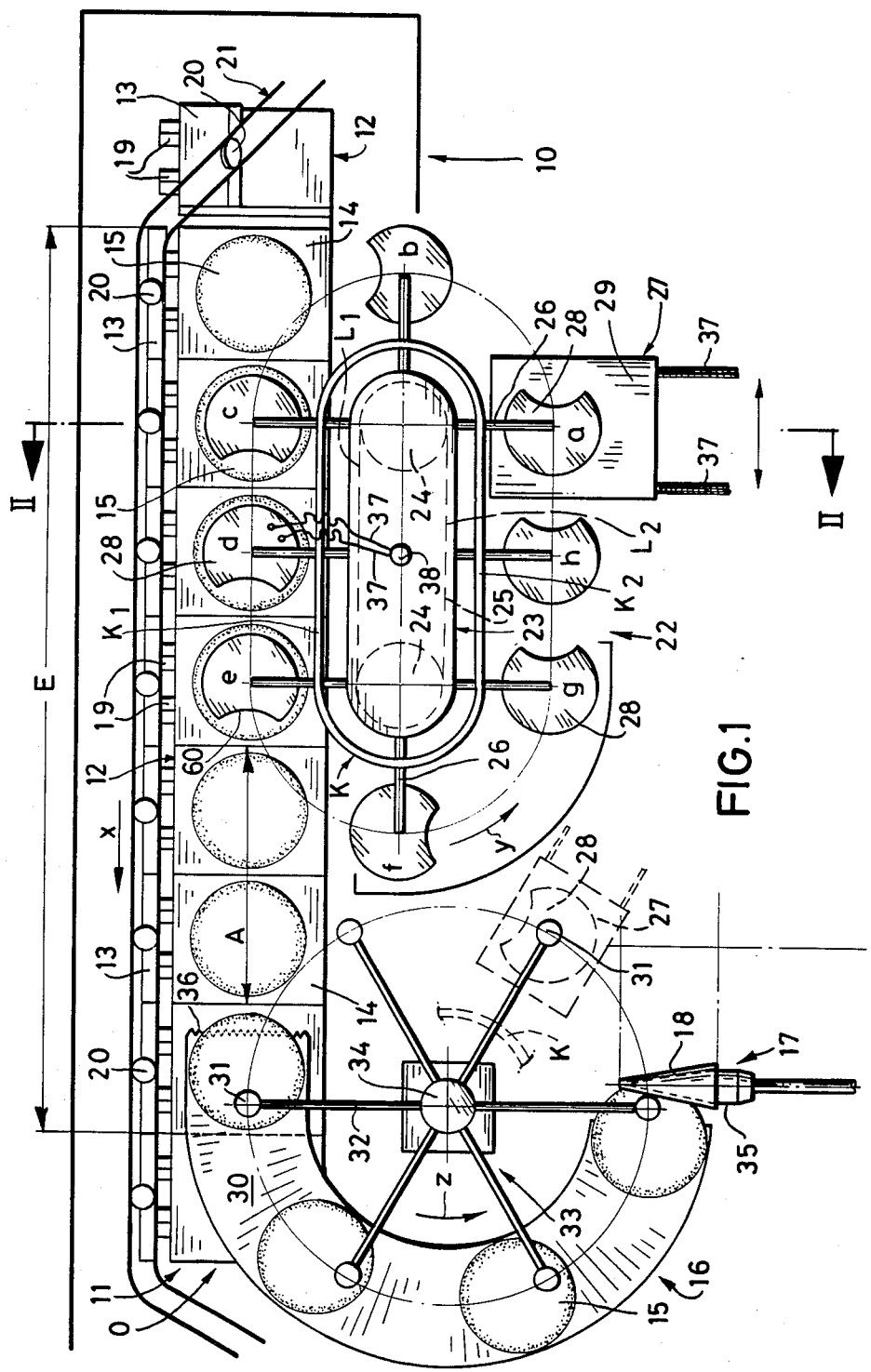
FIG. 1 is a plan view in highly diagrammatic form of a wafer-baking machine using waffle iron-like baking devices and provided with printing means in accordance with the invention.

FIG. 1 shows, in a highly diagrammatic form, only a portion of a wafer-baking machine generally represented at 10 and provided with a baking chain 11 of which only the wrapper stretch 0 is visible. The circulating baking chain 11 carries baking jaws or forms 12 each of which is similar to a waffle iron in that it has a lower form member 14 and an upper form member 13, the latter being closable in the former so that layer of dough is received between the forms and is baked to produce a wafer leaf 15 in each form 12.

The surfaces of the form members 13 and 14 which engage the leaf can be engraved, embossed or otherwise contoured or ridged in a waffle pattern as is common in the production of the leaves which can be coiled to form ice-cream cones.

Along the transport path of the leaves 15, a removal unit 16 is provided which removes a somewhat soft but baked wafer leaf 15 from the lower form member 14 after the form 12 has opened and displaces it through an open side E of the baking machine 10 to a coiling device 17 in which the leaf is coiled or rolled into a conical shape. The resulting cone 18 or 100 is an ice-cream cone as has been described.

The upper and lower form members 13 and 14 are connected by hinges 19 so that the upper form members 13 can be swung upwardly to expose the upper surface of the lower form, thereby enabling introduction of flowable dough into the form and removal of the completed but soft wafer leaf 15. The upper form member 13 is closed onto the dough after the form has been filled therewith and remains closed during the baking process.

The upward and downward swinging movement of the upper form member 13 is effected by providing each such member with a runner 20 sliding in a guide channel 21. This channel can be provided with ramps at its ends for the raising and lowering of the upper form member as can be seen from FIG. 1.

FIG. 1 also shows a printing station 22 which is disposed adjacent the removal region or opening E of the wafer-making machine 10. The printing station 22 comprises a drive part 23 which utilizes a chain 25 passing over sprockets 24 shown only in broken lines and which displaces arms 26 along a closed path generally in a counter-clockwise sense as represented by the arrow y and is visible in FIG. 1.

These arms 26 are displaceable upwardly and downwardly either with parallel movement (FIG. 2) or with a swingable motion (FIG. 3). The path of movement of the chain 25 lies in a horizontal plane parallel to the planes of the flat wafer leaves 15 and their transport path.

The drive chain 25 forms are oval with a first long side $L_1$ and another long side $L_2$.

The first long side $L_1$ forms a movement stretch adjacent the upwardly exposed waffle leaves 15 displaced by the chain 11 while the long side $L_2$ forms a second stretch spaced from the first. This second stretch $L_2$ lies adjacent a color transfer means which can include a stamp pad 27.

Control means, such as a slide-cam arrangement K with slide regions $K_1$ and $K_2$ serve to cause the arms 26 to raise and lower at the appropriate points.

Each of the arms carries a printing stamp 28 whose underside (not visible in FIG. 1) has an engravement printing surface 59 to which an edible ink can be transferred so that with the raising and lowering movement, the printing surfaces are in succession raised from the respective waffle leaves 15 to which they have transferred an imprint, lowered onto the stamp pad surface 29 to be inked therewith raised from the stamp pad surface 29 and lowered onto the wafer leaves 15. The displacement direction of the baking chain 11 is represented at x where the circulating path of the arms and printing stamps is represented by the arrow y.

The printing means at station 22 functions as follows:

In the position a the printing stamp 28 contacts the stamp pad surface 29 so that the edible ink is transferred to the stamp 28.

As the stamp 28 is displaced to position b, it clears the region $K_2$ of the guide track or rail of the slide controller and has been brought into a raised position above the level of the stamp pad.

With further displacement of the stamp 28 and its arm 26 into the position c, the slide rail K lowers the stamp onto the hot waffle leaf 15 which remains pliable because it has not sufficiently cooled.

The stamp 28 remains in contact with the leaf for a certain duration, i.e. to and past position d at which the printing member 28 lies in full printing contact with the leaf 15. The imprint, of course, is transferred to the leaf.

The stamp 28 in position e is lifted by the continuous movement of the arms 26 on the rail K and is carried in a raised position to the location f. From this position and through positions g and h, the stamp is held raised until it is returned to position f, the stamp is lowered into firm contact with the pad surface 29.

The now imprinted wafer 15, on which the print is dried, because of the high temperature of the leaf, continues along the chain 11 on which it is carried to the removal station 16.

The latter has a flat transport sheet 30 rising in a ramp configuration and having a razor-like edge 36 which cooperates with the engraved surface of the lower form 14 to permit the baked leaf 15 to ride upon this ramp sheet where the wafer can come into contact with an entraining stamp 31. The latter can pick-up the leaf and carry it to the cone-shaping device 15. The stamp 31 preferably engages a non-printed portion of the wafer and, to this end, each of the stamps 28 can have a cutout 60 which leaves a portion of the wafer 15 unprinted.

Each of the stamps 31 can be provided at the end of a respective arm 32 of a spider 33 forming a starwheel-type of conveyor whose axis 32 of rotation is centrally disposed with respect to the circular arc segmental shape of the ramp sheet in plan view. The direction of rotation of the spider is represented at z.

The circular movement of the stamp 31 thus serves to entrain the wafers along the sheet 30 to the cone-rolling device 17 while imprinting further indicia upon the wafers. At the rolling station 17 the wafers are rolled into cones in a conventional manner. Naturally, the imprint delivered by the stamp 31 can be used even if the printing station 22 is disabled or when a more limited printing of the wafer is desired. In that case, each stamper 31 can engage a stamp pad. As has been indicated also in broken lines in FIG. 1, a stamp 28 cooperating with the stamp pad 27 can be mounted on each arm 32 and these arms can raised and lowered by a camming rail K in a similar manner to the arms 26 previously described. It is, of course, important that whatever ink be used and whichever of the printing units is employed, that the printing take place at a point along the path of the wafers, which will prevent the print from smearing.

When the printing station 22 is used, a length A of the path of the wafer leaves 15 is provided to provide additional drying time for the ink.

To prevent premature drying of the ink on the printing surfaces 59 of the stamps 28, each of the stamps 28 is provided with a cooling compartment or passage adjacent the surface through which cooling water is circulated via the pipes 37 shown diagrammatically in FIG. 1. Naturally, while the pipes 37 have been shown for only one stamp, they are provided in actuality for each stamp and the pipes can be connected to a distributor 38 disposed centrally and serving to allow passage of the cooling liquid through the respective stamps in spite of their movement along the closed path a shown.

Cooling pipes 37 are also provided for the stamp pad 27 and, as has been illustrated by a double-headed arrow, the stamp pad 27 can be moved back and forth, e.g. with a four-articulation linkage so that stamp pad can follow the stamp 28 during the transfer of ink thereto as the stamp moves in the direction of arrow y.

Figure 2:
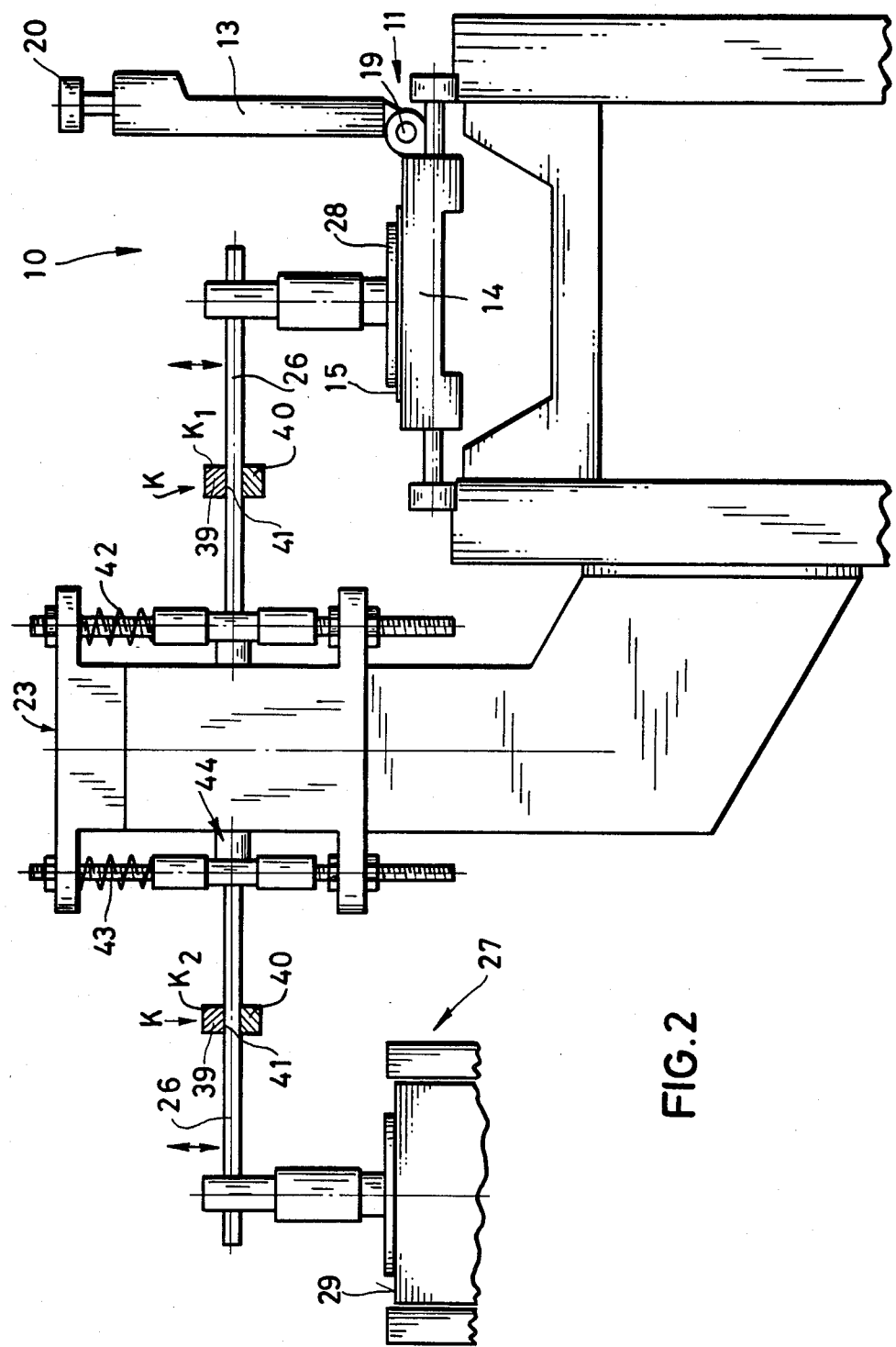
FIG. 2 is an elevational view taken generally along the line II—II of FIG. 1.

FIG. 2 shows how the arms 26 may be raised and lowered in the regions $K_1$ and $K_2$ of the slide-cam arrangement K.

To this end, the slide K has an upper rail 39 and a lower rail 40 between which a gap 41 is provided, the arms 26 being guided in the gap. Damping springs 42 on vertical guides 43 form a parallel motion guide arrangement for the arms as represented generally at 44.

By contrast, in FIG. 3 each of the arms 26 is shown to be tiltable about a fulcrum 45 on a support bracket 46 carried by the chain 25 engaging the sprocket wheel 24. A slot 47 forms a guide for a guide block of the arm 26 which is biased downwardly by a spring 50. In this case, the slide cam K requires only a lower rail 40 upon which a cam follower roller 49 carried by the arm 26 can roll.

To ensure that the stamp 28 will engage the stamp pad and the wafer leaf in a flat rather than tilted position a swivel 51 is provided which is biased by a compression spring 52 to brace the part 28 against the pad or leaf.

FIG. 4 shows the camming rail of FIG. 3 in greater detail, the rail being here shown to have segments 40a and 40b. The segment 40a is fixed while the segment 40b can be adjusted relative to it by a spindle drive 56. A pin 58 of the fixed rail part 40a engages in a slot 57 of the movable rail part 40b. The falling and rising curves 53 and 54 of the ram are connected by a straight portion 55 and can be adjusted to be closer or further apart so that the duration of contact of the stamp with either the stamp pad or the leaf can be varied simply by varying the length of the straight part 55. Of course, both rail sections can be made similarly shiftable.

I claim:

1. A baked cone of edible material formed directly with an imprint of an edible ink by application of a stamp carrying said ink to a flat baked wafer of said edible material in a hot coilable and hardenable state so that said ink penetrates into the material which is coiled into the cone and is applied directly to a baked surface thereof.

* * * * *

UNITED STATES PATENT AND TRADEMARK OFFICE
CERTIFICATE OF CORRECTION

PATENT NO. : 4,859,476
DATED : 22 August 1989
INVENTOR(S) : Heinrich HERTING

It is certified that error appears in the above-identified patent and that said Letters Patent is hereby corrected as shown below:

Title page:

Item [73] Assignee's name is to read:

-- Firma Karl Oexmann, Inh. Wolfgang Oexmann --.

Signed and Sealed this

Seventh Day of August, 1990

*Attest:*

HARRY F. MANBECK, JR.

*Attesting Officer*      *Commissioner of Patents and Trademarks*